Figure 1:
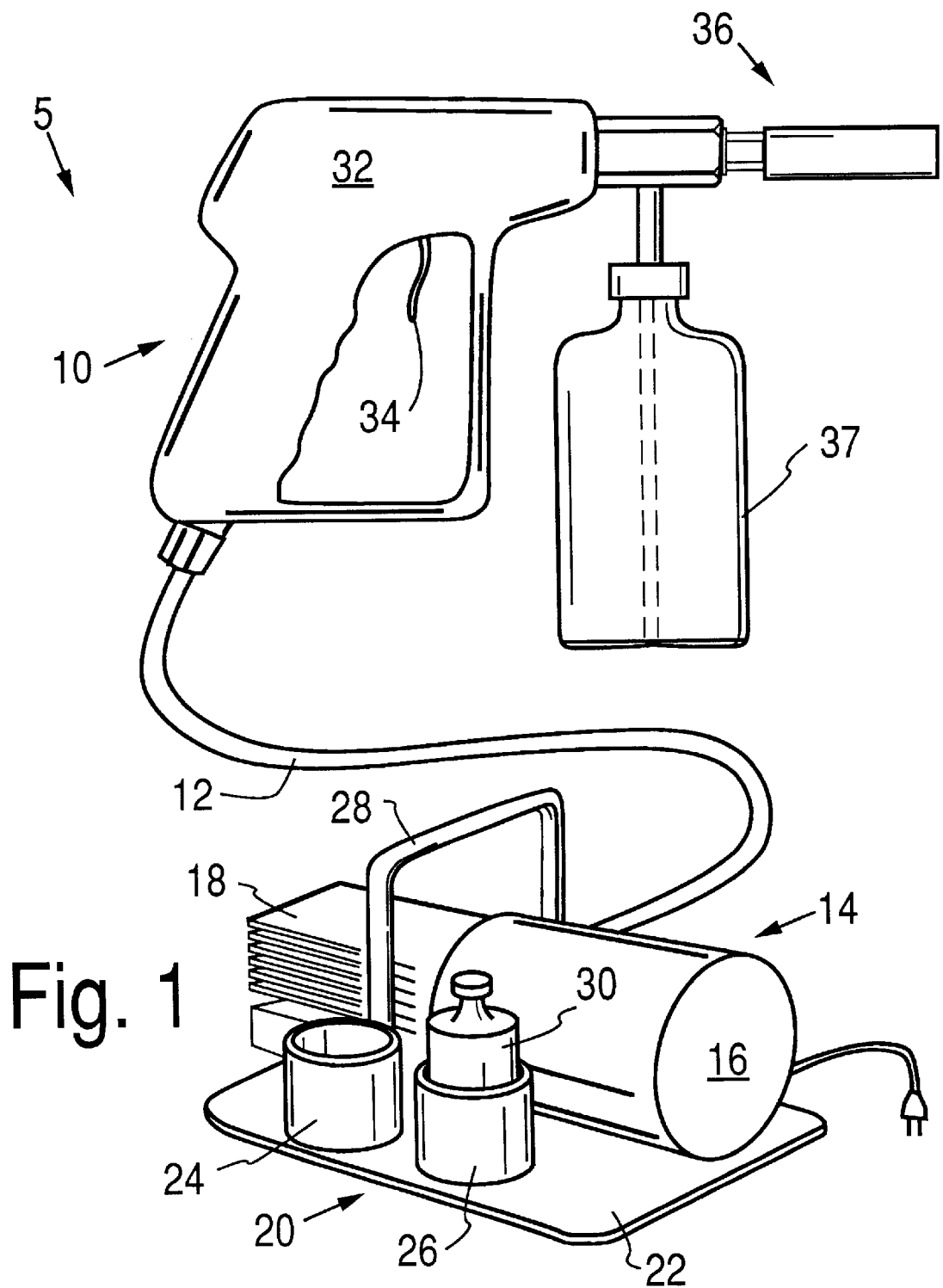

United States Patent
Fisher

[19]

[11] Patent Number: 6,003,787
[45] Date of Patent: Dec. 21, 1999

[54] INSECTICIDE SPRAY APPARATUS

[75] Inventor: Jerry W. Fisher, Morgan Hill, Calif.

[73] Assignee: Cal-Ag Industrial Supply, Inc., Woodland, Calif.

[21] Appl. No.: 09/019,412

[22] Filed: Feb. 5, 1998

Related U.S. Application Data

[60] Provisional application No. 60/037,292, Feb. 5, 1997.

[51] Int. Cl.⁶ .................................................. A61M 11/02
[52] U.S. Cl. .......................... 239/373; 239/418; 239/526; 239/355
[58] Field of Search ..................................... 239/310, 311, 239/318, 373, 375, 418, 433, 434, 526, 346, 351, 355, 360, 369

[56] References Cited

U.S. PATENT DOCUMENTS

| 2,596,074 | 5/1952 | Hawes | 239/375 |
|---|---|---|---|
| 3,675,851 | 7/1972 | Merfeld et al. | 239/318 |
| 4,135,669 | 1/1979 | Bridges et al. | 239/373 |
| 4,653,691 | 3/1987 | Grime | 239/311 |
| 4,790,454 | 12/1988 | Clark et al. | 222/136 |
| 5,064,123 | 11/1991 | Aiello et al. | 239/706 |
| 5,213,263 | 5/1993 | Corona | 239/304 |
| 5,775,591 | 7/1998 | Fauci | 239/304 |

*Primary Examiner*—Andres Kashnikow
*Assistant Examiner*—Lisa Ann Douglas
*Attorney, Agent, or Firm*—Claude A.S. Hamrick; Robert O. Guillot; Oppenheimer Wolff & Donnelly

[57] ABSTRACT

An insecticide spray apparatus (5) for spraying insecticide in confined areas. The insecticide spray apparatus (5) has a spray gun (10) and a compressor assembly (14) for providing compressed air through a flow line (12) to the spray gun (10). A nozzle (36) atomizes the insecticide for fogging operations and a trigger (34) on the spray gun (10) provides on and off control of the spray action. The compressor assembly (14) has a base (22) with a handle (28) such that the compressor assembly (14) can be carried in one hand by the user. A plurality of bottle holders (24) are provided on the base (22) for carrying spare pesticide containers (30).

6 Claims, 4 Drawing Sheets

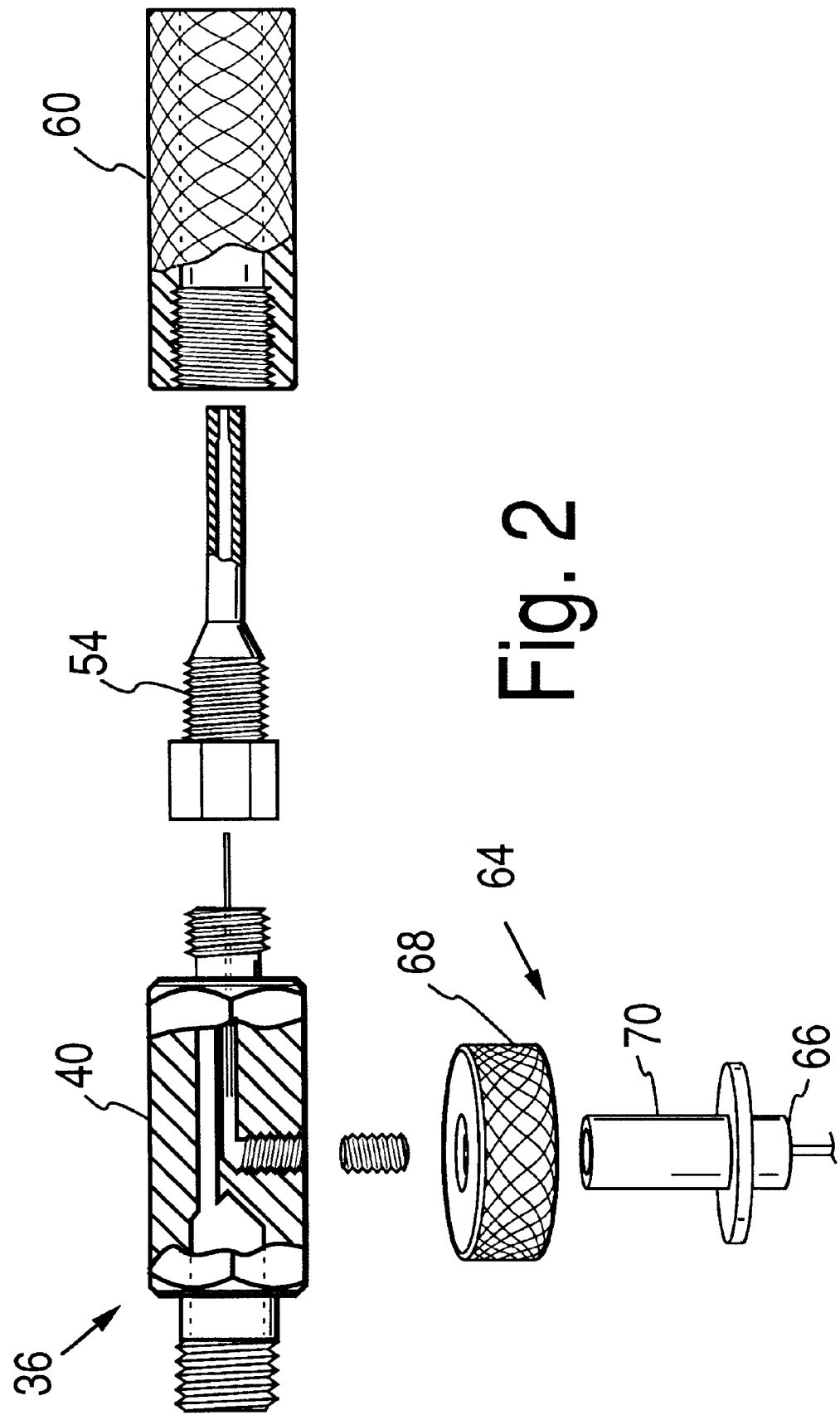

INSECTICIDE SPRAY APPARATUS

This application claims the benefit of U.S. Provisional Application No. 60/037,292, filed Feb. 5, 1997, entitled "Insecticide Spray Apparatus".

TECHNICAL FIELD

The present invention relates to the field of liquid spray apparatus and more specifically to a portable pesticide spray system including an improved nozzle construction for generating micron-sized droplets of pesticide. The predominant current usage of the present inventive insecticide spray apparatus is in the extermination of pests in enclosed areas wherein it is desirable to place insecticide in specific areas while avoiding unwanted dripping and overspray.

BACKGROUND ART

In the extermination of insect pests, such as cockroaches and the like, it is widely practiced to spray those areas where such insects are known to travel. Such areas include the hidden corners of cupboards and cabinets, and behind appliances, and other such secluded places. The well known conventional appliance for accomplishing such spraying is a hand pressurized sprayer such as that used for spraying a great variety of liquids in both commercial and noncommercial applications. Such spraying devices are inexpensive and reliable, and do a very adequate job of dispensing liquids in a medium fine spray pattern. However, although no superior device has been discovered in the industry, as evidenced by the still widespread use of the conventional sprayers, such sprayers do broadcast the liquid as small droplets in a fairly indiscriminate pattern. These droplets then settle on all objects in the path of the spray, and the droplets readily condense and join into larger drops which can carry the toxic liquid into areas wherein it is certainly not desirable to place such liquid, such as unprotected food storage areas.

A part of the problem with the prior art methods has involved the fact that it is necessary to make sure that sufficient insecticide is delivered to those particular areas where the insects tend to accumulate and travel. In order to insure this, it is sometimes necessary to spray a great deal of insecticide toward the intended area, with much of this spray falling in unintended areas.

Still another problem with prior art methods and means has been that pesticides are delivered in liquid form which will run off of generally vertical surfaces, rather than sticking to and settling on such surfaces. Therefore, much of the effective power of the insecticide runs away from the intended area rather than staying where intended. This is a particular problem where it is intended that the pesticide have a very long lasting effect, such as in spraying for ants, and the like.

Yet another problem with prior art methods and means has been that spray could be delivered generally only in a "line of sight", thereby missing many hidden crevices and hiding places of the pest.

It would be desirable to find a way to accurately and effectively place the spray in the intended areas such that a lesser total quantity of insecticide could be used, thereby minimizing the amount delivered to unintended areas. However, to the inventor's knowledge, no prior art insecticide spraying mechanism has accomplished this. To date, the conventional hand pressurized spray tank mechanism remains essentially universally accepted in this application.

DISCLOSURE OF INVENTION

Accordingly, it is an object of the present invention to provide a spraying device suitable for spraying insecticide.

It is still another object of the present invention to provide a spraying device which is readily portable.

It is yet another object of the present invention to provide a spraying device which will atomize a liquid insecticide.

It is still another object of the present invention to provide a spraying device which will create a very fine spray mist.

It is yet another object of the present invention to provide a spraying device which will accurately direct a spray mist into relatively inaccessible areas.

It is still another object of the present invention to provide a spraying device which will prevent excessive overspray and accumulate of the sprayed fluid in unintended areas.

It is yet another object of the present invention to provide a spraying device which will effectively deliver insecticide beyond a "line of sight" spray pattern.

It is still another object of the present invention to provide a spraying device which will deliver a relatively dry deposit which will stick to surfaces rather than run off.

Briefly, the preferred embodiment of the present invention is a portable hand carried spraying mechanism having a powered pump mechanism for providing fluid (an insecticide) through a tube to an atomizer type spray head (nozzle mechanism). A supply of fluid is affixed to the pump mechanism. The pump mechanism is equipped with a handle such that a user can carrying the pump mechanism in one hand and the nozzle mechanism in the other. Insecticide is emitted from the nozzle in generally micron sized particles according to the process generally known as atomization of the liquid insecticide.

An advantage of the present invention is that less toxic insecticide need be disbursed in order to insure that the intended areas are effectively treated.

A further advantage of the present invention is that overspray and fluid dripping are minimized.

Yet another advantage of the present invention is that a pesticide is deposited on a surface in a relatively dry form which will stick to the surface rather than run off.

Still another advantage of the present invention is that a pesticide can be delivered to relatively hidden crevices, and the like, out of the "line of sight"of the user or a direct spray pattern.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWINGS

FIG. 1 is a perspective diagrammatic view of an insecticide spray apparatus, according to the present invention;

FIG. 1A is a partially cut away view of a nozzle portion of the spray gun of FIG. 1;

FIG. 2 is a partially exploded view of the nozzle of FIG. 1A;

FIG. 3 is a partially cut away view of the base fitting of FIG. 1A;

FIG. 3A is a cross sectional view of the base fitting of FIG. 3, taken along line 3—3 of FIG. 3; and FIG. 4 is a partially cut away view of a fitting as depicted in FIG. 1A.

BEST MODE FOR CARRYING OUT INVENTION

The best presently known mode for carrying out the invention is a handheld insecticide spray apparatus. The inventive insecticide spray apparatus is depicted in a perspective diagrammatic view in FIG. 1 and is designated therein by the general reference character 5. The insecticide spray apparatus 5 has a spray gun 10 shown connected by a tubular flow line 12 to a compressor 18 which is part of a compressor assembly 14. The assembly 14 includes a molded carrier 20 having a base 22 with chemical supply bottle holders 24 and 26 and a handle 28 molded integral thereto. The holders 24 and 26 are suitable for carrying pesticide containers such as that illustrated at 30. The spray gun 10 is comprised of a conventional molded plastic pistol grip 32 having a trigger 34 for controlling the flow of air from compressor 14 to a nozzle assembly 36.

Figure 1A:
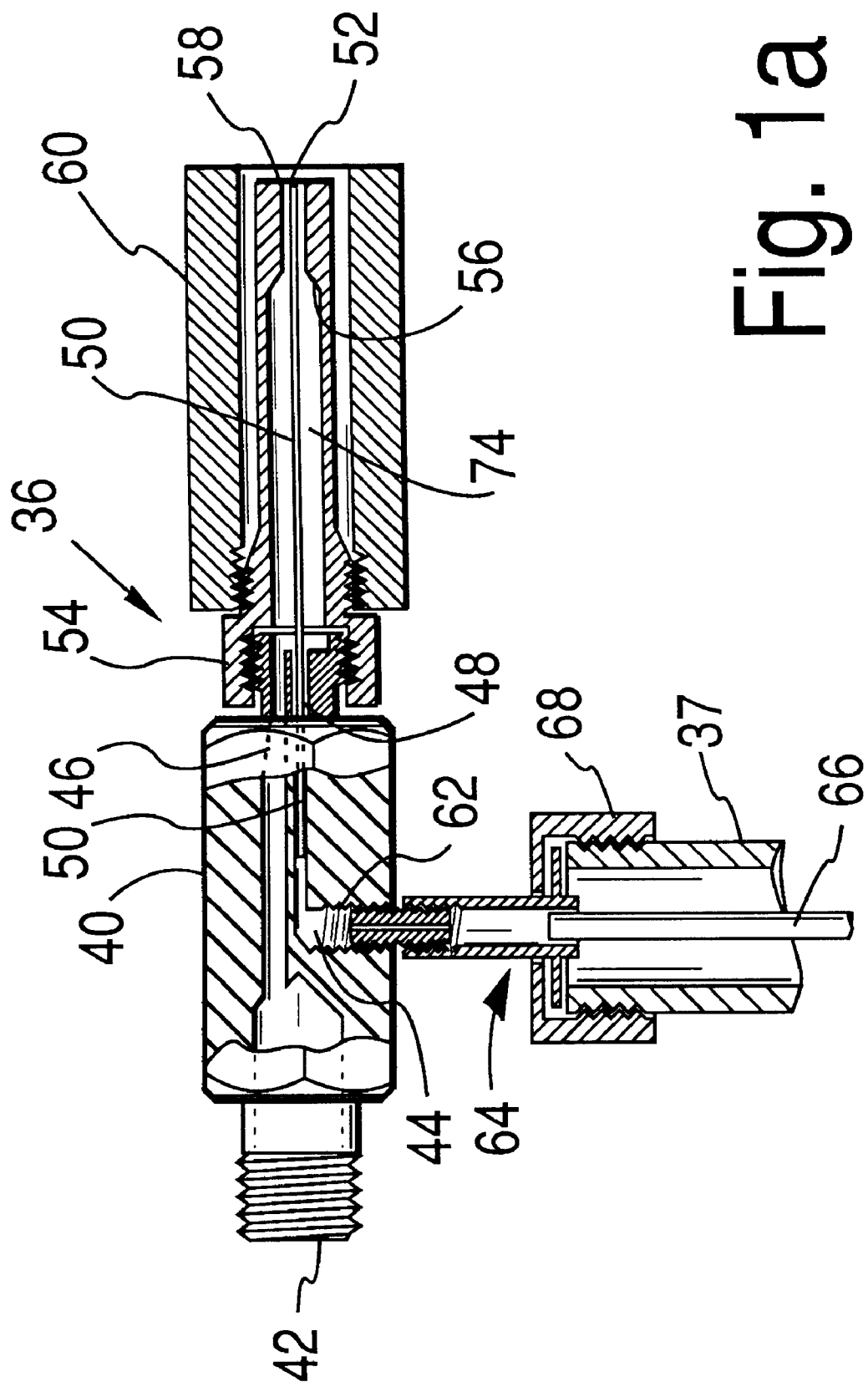

The assembled nozzle assembly 36 is shown in a partially cut away view FIG. 1A and includes a base fitting 40 having an entry port 42 for receiving compressed air, an entry port 44 for receiving pesticide or other liquid, an exit port 46 for the compressed air, and a liquid exit port 48 having an elongated cylindrical needle 50 extending out of port 48 and providing an extremely small fluid exit orifice 52. Affixed to fitting 40 is a fitting 54 having an axial bore that is necked down at 56 to provide a cylindrical orifice 58 for coaxially receiving the cylindrical needle 50. Disposed around the needle 50 is a protective sleeve 60.

Affixed to fluid entry port 44 by a threaded plug 62 is a liquid container cap assembly 64 having a draw tube 66 affixed thereto for extending into a liquid supply container 37. Details of the various components illustrated in FIG. 1A are shown in FIGS. 2 through 8.

FIG. 2 is an exploded view of the nozzle 36 of FIG. 1A, wherein additional parts can be seen. In the view of FIG. 2, it can be seen that the liquid container cap assembly 64 has a grip ring 68 which, when the unit is assembled as shown in the view of FIG. 1A, partially surrounds a junction fitting 70. The junction fitting 70 has the draw tube 66 extending therefrom. It should be noted that the junction fitting 70 could optionally be replaced with a fitting (not shown) such that draw tubes of varying lengths (not shown) could be fitted in order to accommodate different sizes of the liquid supply container 37 (FIGS. 1 and 1A). Also in the view of FIG. 2 it can be seen that the thread plug screws into the top of the junction fitting 70 (as well as into the base fitting, as previously discussed herein), thereby holding together the assembled liquid container cap assembly. As can be better seen in the view of FIG. 1A, the inside of the grip ring 68 is threaded to accept the liquid supply container 37.

Figure 3:
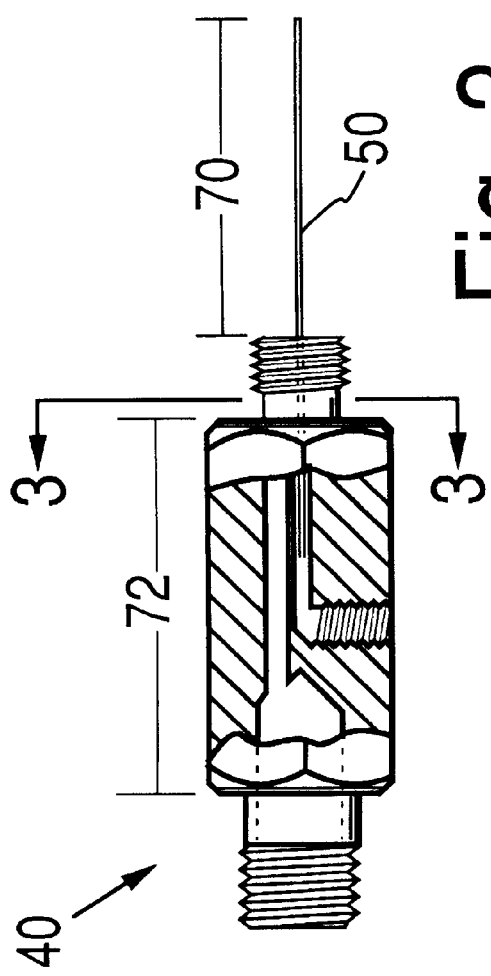
Figure 3A:
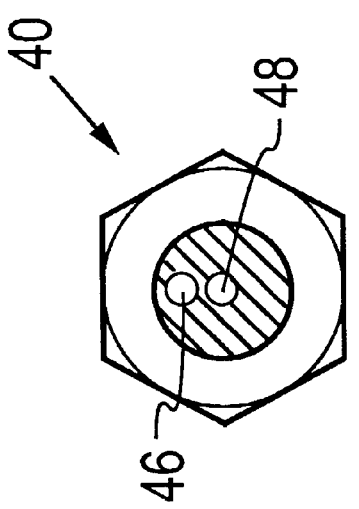

FIG. 3 is a partially cut away view of the base fitting 40 of FIG. 1A, showing some of the dimensions relevant to the operation thereof. As can be seen in the view FIG. 3, in this embodiment a body length 72 of the nozzle is approximately 0.94 inch. The elongated cylindrical needle 50 projects a needle projection length 74 of approximately 1.32 inch from the base fitting 40. The outside diameter of the cylindrical needle 50 in this embodiment is approximately 0.0425 inch. FIG. 3A is a cross sectional view of the nozzle 40, take along line 3—3. In the view of FIG. 3A, the air exit port 46 and the pesticide exit port 48 can be seen.

Figure 4:
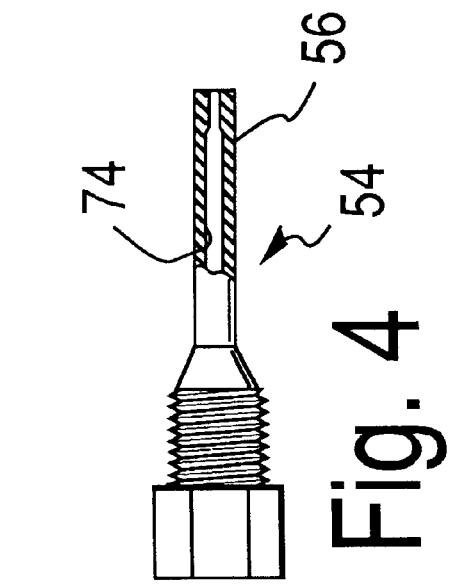

FIG. 4 is a partially cut away view of the fitting 54 of FIG. 1A. By comparing the view of FIG. 1A and that of FIG. 4, it can be seen that the fitting 54 has but the single air passage 74 which is necked down, as discussed previously herein at position 56. Thus, the two exit ports 46 and 48 both provide passage into the air passage 74 such that, while the elongated cylindrical needle 50 runs through the air passage 74, air (or other compressed gas, as will be discussed hereinafter) passes through the air passage 74, as well. This part of the construction can best be seen in the view of FIG. 1A.

Various modifications may be made to the invention without altering its value or scope. For example, and the best presently known embodiment 5 of the invention uses the air compressor 18 to provide compressed air for atomizing the insecticide, air flow through the nozzle 36 could also be generated by other means, such as liquid carbon dioxide bottles, or the like, or essentially any means capable of producing around 40 pounds per square inch of pressure. Indeed, it is within the scope of the invention that a pressurized liquid pump be used to provide liquid under pressure to the nozzle 36 (with appropriate modifications to the nozzle 36), much in the manner of an "airless" paint spray mechanism.

Yet another likely modification would be to mount a plurality of the nozzles 36 on a manifold for spraying larger areas.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The inventive insecticide spray apparatus 5 is intended to be widely used for dispensing insecticide within confined areas such as in and behind cabinets and appliances in kitchens, and in other areas where insect pests tend to accumulate and/or travel. The pesticide used could be any such intended to be used for "fogging" applications within residential structures, commercial, institutional, food processing plants, greenhouses and many other structures and locations. The inventive insecticide spray apparatus may also be used for depositing residual (long-lasting) pesticides on various types of surfaces for a relatively dry, yet thorough application. Examples of such applications would be the application of flea spray on carpets for flea control, or the application of other insecticide on stucco or wood for the control of spiders or other such insects. In short, the inventive insecticide spray apparatus 5 provides very quick applications of pesticides which will migrate to areas not easily reached with conventional equipment.

A method associated with the use of the inventive insecticide spray apparatus 5 is, having the apparatus as described herein, to provide the insecticide in the liquid supply container 37 and to provide power to the motor 16 such that the compressor assembly 14 supplies compressed air through the flow line 12 to the spray gun 10. Then, upon pulling the trigger 34, the spray gun atomizes the insecticide such that an insecticide fog permeates even unseen hiding places of insect pests. The fog is such that it alights on surfaces in a relatively dry form which tends to stick to such surfaces and not run off.

As can be seen in light of the above description, the nozzle 36 (which in this embodiment is machined from brass) is a micron-size particle generator which applies pesticides via venturi action. Venturi action atomizers are known in the art, but the application of such to be used for applying insecticides in a hand-held sprayer for use in confined areas is a considerable improvement over the method and associated apparatus that is almost universally used today.

Since the insecticide spray apparatus 5 of the present invention may be readily produced and integrated into existing pest control systems and methods, and since the advantages of economy and safety as described herein are provided, it is expected that it will be readily accepted in the industry. For these and other reasons, it is expected that the utility and industrial applicability of the invention will be both significant in scope and long lasting in duration.

I claim:

1. An insecticide spray system for emitting a very fine mist-like spray of insecticide, comprising:

a container for containing a supply of insecticide;

a portable pump unit for generating a high pressure flow of gas and having a handle suitable for enabling the pump unit to be carried with one hand;

a spray gun having an atomizing mechanism disposed within an extended nozzle for generating and directing mist-like spray, said atomizing mechanism including means forming an elongated cylindrical passageway having one end for receiving a high pressure flow of gas from said pump, and having a second end forming an exit orifice proximate the distal end of said nozzle, and an elongated tubular needle extending through said passageway and having a first end for receiving the insecticide, and a distal end extending into said exit orifice, the diameter of said needle being small compared to said orifice; and means for communicating insecticide from the container to the nozzle;

whereby gas flowing through said orifice causes, through venturi action, said insecticide to be drawn from said container and through said needle, and to be atomized and discharged from said nozzle as a mist-like spray.

2. The insecticide spray system of claim 1, and further including:

a container holder for holding a spare container of insecticide affixed to the pump unit.

3. The insecticide spray system of claim 1, wherein said spray gun further includes a trigger assembly for controlling the flow of gas to the atomizing mechanism.

4. The insecticide spray system of claim 1, wherein:

the portable pump unit includes an air compressor and a motor for driving the air compressor.

5. The insecticide spray system of claim 1, wherein said handle forms part of a carrying device that includes a platform to which the pump unit is affixed, said handle being affixed to the platform such that the pumping unit hangs below the handle.

6. The insecticide spray system of claim 1, wherein the diameter of said needle is approximately 0.0425 inch.

* * * * *